April 17, 1945.   J. H. BALTHIS   2,374,069
METHOD OF PLASTICIZING POLYAMIDES
Filed March 13, 1941
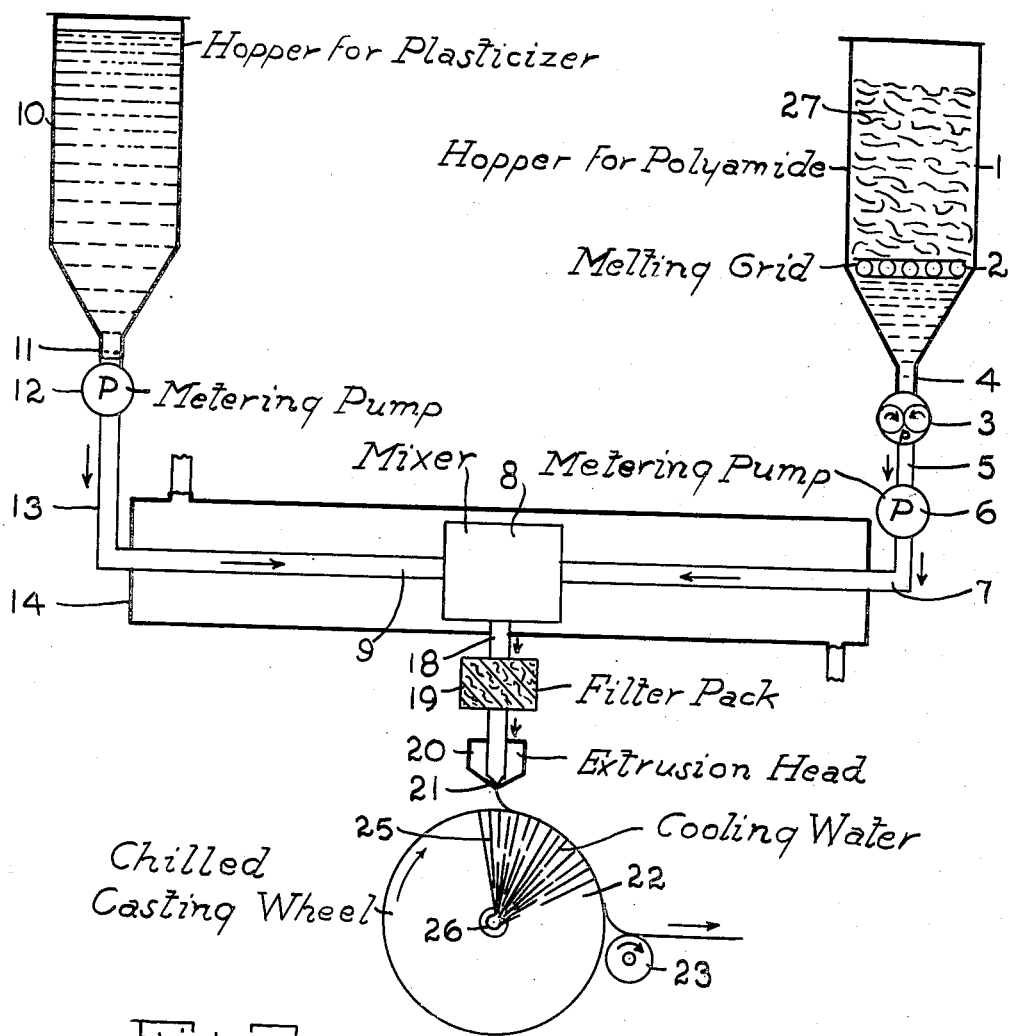
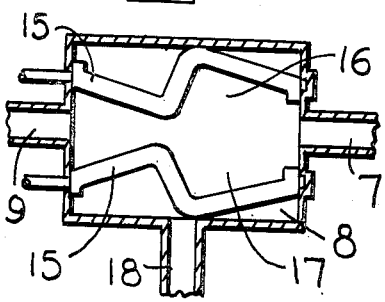
Inventor
Joseph H. Balthis
By R. F. Miller.
Attorney Patented Apr. 17, 1945

2,374,069

UNITED STATES PATENT OFFICE 2,374,069

METHOD OF PLASTICIZING POLYAMIDES

Joseph H. Balthis, Wilmington, Del., assignor to E. I. du Pont de Nemours & Company, Wilmington, Del., a corporation of Delaware Application March 13, 1941, Serial No. 383,233

6 Claims. (Cl. 18—57)

This invention relates to synthetic linear polyamides and more particularly to plasticized compositions comprising these polymers.

The polyamides improved by the practice of this invention are obtained from reactants of the general type described in United States Patents 2,071,250, 2,071,253, and 2,130,948. They are obtained from polymerizable amino carboxylic acids and by reacting diamines with dicarboxylic acids, it being understood that reference to the above mentioned acids includes also their equivalent amide-forming derivatives, which in the case of the amino acids include the lactams and aminonitriles. These polyamides may be identified by one or more of several characteristics including their capability of being formed into films or filaments which can be cold drawn into fibers (in the case of filaments) showing by characteristic X-ray patterns orientation in the direction of elongation; by their microcrystalline rather than resinous structure; by their linear structure in which amide or thioamide groups, separated usually by an average of at least two carbon atoms, are an integral part of the main chain of atoms; and by the monomeric amide-forming compounds comprising the amino acid hydrochloride or a mixture of diamine hydrochloride and dibasic carboxylic acid obtained by hydrolysis of the polymers with strong mineral acids. For the best film-forming or fiber-forming properties the monomeric materials are polymerized to an intrinsic viscosity (defined in mentioned U. S. Patent 2,130,948) of at least about 0.4 and preferably 1.0.

For some purposes, for instance, in the case of sheets, films, and coatings on fabrics, it is desirable to increase the pliability of the polyamides by incorporating plasticizers therewith. In addition, high flex durability, by which is meant ability to resist cracking on repeated flexing, is particularly essential in films and coated fabrics which are used as a replacement for leather in shoes, upholstery, and the like. No difficulty is experienced in obtaining the desired flex durability when the plasticizer and polymer are blended by means of a common solvent. This method, however, is of restricted application because of the insolubility of many polyamides in practical non-toxic and non-corrosive solvents. This procedural difficulty can be overcome by melt blending the molten polyamide with the plasticizing agent which has heretofore been regarded as being inert to the polyamide in the case of melt blending as it is in the case of solution blending.

I have found, however, that while the plasticizing agents used heretofore in melt blending processes have the expected effect with regard to increased pliability, reduced tensile strength and essentially unchanged elongation, they are not likewise predictable with regard to flex durability. Thus, I have shown by tests that the plasticized polyamides previously obtained by melt blending are markedly inferior in flex durability to the plasticized polyamides obtained by low temperature blending through a solvent. This large decrease in flex durability is not due simply to thermal degradation of the polymer since thermal degradation of the unmodified polymer is relatively slow, whereas the flex durability of plasticized polyamides is seriously impaired in a length of time insufficient to produce a comparable effect with plasticizer-free polyamides.

The above mentioned deteriorating effect of high temperature on the molten mixture of plasticizer and polyamide is inherent in the mixing methods ordinarily used. The high viscosity of the polyamides at practical blending temperatures makes homogenization very difficult, and batchwise methods of mixing, involving the agitation of large volumes of plasticizer and polymer, are largely impractical because excessive time is required to attain homogeneity and to form useful objects from the composition after mixing.

This invention has as an object the preparation of improved plasticized polyamides useful in making filaments, bristles, ribbons, films, sheets, coated fabrics, etc. A further object is to obtain, by a new method of melt blending, plasticized polyamides which are superior in flex durability to either the unplasticized polyamides or to the plasticized polyamides obtained by the method of melt blending as heretofore used. Other objects will appear hereinafter.

The above objects are accomplished by the method more fully described below which comprises rapidly mixing the plasticizing agent and a molten synthetic linear polyamide with agitation at a temperature above the melting point of the mixture, and cooling the mixture to below its melting points as soon as a homogeneous mix is obtained. In the preferred embodiment of the invention the required rapid mixing and cooling of the molten mixture is effected before the intrinsic viscosity of the polyamide has decreased to less than 0.95.

Apparatus suitable for carrying out the process of this invention is illustrated in the accompanying drawing in which Figure 1 is a schematic assembly drawing of the entire apparatus, and Figure 2 is a view partly in cross-section of the interior of the mixing chamber.

The plasticizer-free polyamide contained in charging hopper 1 under oxygen-free nitrogen at a pressure of 10 lbs. per sq. in. gauge is supported on melting grid 2 which is in the form of a pancake coil of tubing heated internally by condensing Dowtherm vapor. The flake polymer 27 melts and runs through the grid to the rotary gear booster pump 3 by way of conduit 4, from which it passes via conduit 5 to metering pump 6. The feed to booster pump 3 usually contains bubbles of gas which vary in quantity from time to time and which may cause slight fluctuations in the rate of booster pump delivery. The bubbles of gas are dissolved in the polymer by pressure developed in the booster pump 3 and a constant delivery of homogeneous bubble-free polymer then issues from metering pump 6 which is fitted with closer clearances than is booster pump 3. The metered and bubble-free polymer then passes through line 7 to mixer 8 into which is simultaneously admitted from line 9 to a metered stream of hot plasticizer. Prior to entering the mixer the plasticizer, which is stored in tank 10, flows through conduit 11 into metering gear pump 12 which forces it at a uniform rate through conduit 13 into the mixer. The plasticizer is preheated in conduit 13 to approximately the temperature of the molten polyamide by means of the heating jacket 14 which may also serve to maintain the polymer passing in the mixer and in line 7 at the desired elevated temperature. The gear pumps 3 and 6, with interconnecting lines 4 and 5 are also surrounded by a metal jacket (not shown) heated internally by condensing Dowtherm vapor.

The mixer, as shown in detail in Figure 2, consists of two blades 15 horizontally disposed and actuated by suitable gearing, so that they sweep the entire area of half-cylinders 16 and 17 in each revolution, and revolving toward each other at unequal speed ratio, pass the material back and forth from one to the other, imparting to it both transverse and lateral motion. The homogeneous mixture of plasticized polymer passes from mixer 8 through passage 18 to the filter pack 19 containing layers of carefully elutriated sand of decreasing particle size in the direction of flow and screens of various mesh sizes. The pack, which is customary in the art, not only serves to remove foreign particles from the melt, but also to maintain the pressure imposed by the pumps at a sufficiently high level to prevent the dissolved bubbles from reappearing. The filtered mixture is then forced into extrusion head 20 which is fitted at its base with lips 21 permitting the extrusion of a thin uniform film of the plasticized polymer upon rotating casting wheel 22. The speed of casting wheel 22 is adjusted to the speed of extrusion in such manner that a film of the desired thickness is obtained. The face of the casting wheel is polished and it is cooled on its underside by water which can be circulated or sprayed as shown at 25 from a conduit 26. The cooled film is withdrawn over roller 23. Coated fabric, of particular interest as a leather substitute, may be produced by passing a fabric under the lips of extrusion head 21 and suitably cooling the extruded coating before the fabric is tendered.

The method described in connection with the apparatus illustrated above, this method comprising melt blending a stream of molten polymer rapidly and continuously with a stream of hot plasticizer and immediately thereafter forming the composition in useful shape and cooling, provides a practical means for obtaining highly flex durable products by overcoming the difficulty in bringing about homogenization within the short time required. It is preferred in connection with this method of melt blending to use a highly efficient mechanical means of agitation, operating in a small heated streamlined mixing chamber designed to reduce the time of contact to a minimum. The cooling of the molten mixture is desirably effected at the same rate as the mixture is formed by forcing the mixture through an opening of the desired size and shape and solidifying the formed composition.

The most important requirements of the continuous mixing means used to agitate the polymer with the plasticizer are efficiency and compactness of size. A gear pump, operating at high speed with relatively large clearances, can be used. Occasionally, it is advantageous to rotate the gears of such a pump countercurrent to the direction of flow of the plasticized mixture when the driving force is supplied by the plasticizer and polymer pumps back of the mixing pump; in this case greater clearances are usually required in the pump than for co-current flow. A conventional screw pump can be adapted for mixing. A propeller type agitator, particularly one fitted with dual blades so designed that the top impeller sends a stream downward and the bottom impeller sends a stream upward, is an efficient mixing device. A dough mixer with two arms rotating in opposite directions, usually at different speeds and in a divided trough, can be used to handle the thick mixture. Similar mixing devices can be employed when the mixing operation is carried out batch-wise, rather than continuously, as for example, horseshoe type agitators, paddles with intermeshing stationary fingers, and double motion paddles.

Mixing can be carried out at atmospheric, superatmospheric, or subatmospheric pressure. The preferred pressure depends to some extent upon the method of mixing and is related to the tendency of polyamides, plasticized or unplasticized, to form bubbles upon holding for a period of time in the molten condition. These bubbles can be redissolved in the mixture by application of pressure. The formation of bubbles does not occur when mixing is conducted rapidly in continuous manner at superatmospheric pressure and is immediately followed by cooling. More time is required for batch-wise mixing and in this case it is usually advantageous to mix at more nearly atmospheric pressure and then to increae the pressure immediately prior to extrusion to dissolve any bubbles which have formed.

The plasticized polymer, produced according to the methods of this invention, can be extruded in many useful forms and shapes, for example, as a coating on wire or fabric or as bristle, film, fiber, tubing, or rod. It is important that the mixture be cooled soon after mixing, for the formation of gaseous decomposition products and reduction in intrinsic viscosity and in flex durability of the plasticized polymer are thereby avoided. The homogenized molten mixture is usually forced through a filtering device and a shaping die, located in close proximity to the mixing chamber, and immediately quenched (i. e., cooled). The plasticized polymer can be cooled without shaping and later fabricated into useful physical form. In this instance low temperature forming methods are preferred, for it is difficult to remelt and form the plasticized polymer without excessive exposure to injurious temperatures.

The invention is further illustrated by the following example.

Ten pounds of interpolymerized polyhexamethylene adipamide and polyhexamethylene sebacamide, with a calculated ratio of three parts of the adipamide and 7 parts of the sebacamide, of intrinsic viscosity 1.05, contained in the charging hopper 1 under oxygen-free nitrogen at a pressure of 10 lbs. per sq. in. gauge was melted on the heated grid 2. From the grid the molten polymer passes through the booster pump 3 into the special 2-gear metering pump 6 of the type referred to above. This pump discharged the polymer continuously into the heated mixer 8 at which point the polymer was intimately mixed with diphenyloloctadecane likewise pumped continuously into the mixing chamber. Prior to its introduction into the mixing chamber the diphenyloloctadecane was heated to the extrusion temperature of 240° C. by passage through the preheater 14. The mixing chamber was about 6 cu. in. in volume which, at the polymer pumping rate of 4 lbs. per hour and the plasticizer pumping rate of 2.67 lbs. per hour, corresponded to a time of contact during mixing of about 2 minutes. Immediately after mixing, the plasticized polymer was filtered and extruded from the slit in the extrusion head 20 onto the polished surface of the water cooled casting wheel 22. The resulting 8.0 x 0.007 inch film, after bringing to equilibrium at 25° C. and 50% relative humidity, had the following physical properties:

Tensile strength—2500 lbs. per sq. in.
Elongation to break—about 400%
Modulus of elasticity—10,200 lbs. per sq. in.
Flex durability—greater than 1,000,000 cycles
Intrinsic viscosity—0.99

A layer of kerosene was maintained on the surface of the wheel to keep the film from sticking.

The improved physical properties of the film of the foregoing example, particularly with regard to its outstanding flex durability, will be apparent from comparison of these properties with those given below for a similar film which contained the same amount of the above plasticizer, which was made from the same ingredients by the prior method of melt blending and which had the following properties:

Tensile strength—1256 lbs. per sq. in.
Elongation to break—202%
Modulus of elasticity—9,200 lbs. per sq. in.
Flex durability—40,000 cycles
Intrinsic viscosity—0.85

In making this film the plasticizer and polymer were melted together in about 2 hours in an oxygen-free pressure vessel and homogenized by mechanical agitation for 20 minutes and then extruded as a film. The flex durability was determined in both instances by mechanically collapsing and expanding a cylinder, formed from the film, at the rate of about 400 cycles per second, and noting the number of cycles before a crack could be seen in the film.

This invention is applicable in general with the materials known to be useful for plasticizing polyamides. Diphenyloloctadecane is particularly advantageous in the present process by reason of its low volatility and relative insolubility in water, and by reason of the superior flex durability, stability, and resistance toward cracking at low temperatures of compositions plasticized therewith. Amyl benzene sulfonamide and N-ethyl toluene sulfonamide are also very effective plasticizers. Other useful plasticizing agents include the high boiling (above 220° C.) phenols, which may be polyhydric or C-alkyl substituted such as diamyl phenol, octyl phenol and diphenylolpropane, and the high boiling monomeric amides, of which the aryl and N-alkyl aryl sulfonamides are particularly desirable.

The invention is not limited to highly compatible plasticizers such as phenols and sulfonamides, and other plasticizing substances which by themselves are poorly compatible or entirely incompatible with polyamides may be used. Compatible plasticizers such as phenols and sulfonamides may be used to blend these poorly compatible substances with polyamides, and in many cases their incorporation adds to the attractiveness of the plasticized composition. Thus, butyl phthalyl butyl glycolate, $C_4H_9O_2C.C_6H_4.CO_2CH_2CO_2C_4H_9$, when used with diphenyloloctadecane gives products of improved flex cracking resistance at low temperature.

The amount of plasticizer admixed with the polymer depends upon the contemplated use and the intrinsic pliability of the original polymer. Eighty-five parts by weight of polyhexamethylene adipamide-sebacamide plasticized with 15 parts of N-ethyl toluene sulfonamide is eminently suitable as an electrically insulating coating for wire. Higher proportions of plasticizer are usually required to reproduce the pliability of leather. For most purposes 50% or less by weight of plasticizer is sufficient.

This invention is best practiced with the high molecular weight or fiber-forming polyamides which have an intrinsic viscosity of at least 0.4. Further examples of these polymers are polydecamethylene adipamide, polydecamethylene sebacamide, poly-m-phenylene sebacamide, 6-amino-caproic acid polymer, 12-aminostearic acid polymer, as well as other polyamides and interpolyamides of the type mentioned in the patents previously referred to. It is to be understood that mention of polyamides herein refers also to the interpolymers, as for instance the polyester amides, obtained by including glycols or other linear-polymer-forming reactants with the polyamide-forming reactants.

The interpolyamides because of their greater pliability are as a rule more desirable for the present purpose than the simple polyamides. Particularly suitable interpolyamides are formed by the interpolymerization of 60 parts by weight of hexamethylenediammonium adipate with 40 parts by weight of epsilon-caprolactam, and by the interpolymerization of 30 parts by weight of hexamethylenediammonium adipate with 70 parts by weight of hexamethylenediammonium sebacate, and by the interpolymerization of hexamethylenediammonium adipate, hexamethylenediammonium sebacate and epsilonaminocaproic acid in the ratio of 4:3:3 by weight.

Polymers of unusually high intrinsic viscosity, generally above 1.0, are advantageously used when high flex durability is required of the plasticized composition, and it is important that the intrinsic viscosity o fthe polymer in the final film also be high (generally above 0.95). This final intrinsic viscosity can be determined after eliminating the plasticizer, by dissolving the plasticized polymer and then precipitating in a liquid which is a solvent for the plasticizer and a nonsolvent for the polymer. The importance of high intrinsic viscosity is illustrated by the large increase in flex durability accompanying increase in intrinsic viscosity. Thus in the case of an interpolymer of polyhexamethylene adipamide and polyhexamethylene sebacamide plasticized with two-thirds its weight of diphenylolactadecane, the flex durability to failure was 28, 40,000 and 711,000 cycles for intrinsic viscosities of the polymer in the final film of 0.65, 0.80 and 1.00 respectively.

The intrinsic viscosity and the durability upon flexing of plasticized polyamides are markedly lowered by increase in the time of contact between the plasticizer and the polymer at the melt blending temperature. The exact time which can be tolerated depends upon many factors, as, for example, the initial intrinsic viscosity of the polymer and the mixing temperatures employed, but for temperatures above 200° C. it is usually desirable to complete all the operation of blending, shaping, and cooling the plasticized composition within ten minutes of the initial contact between the plasticizer and the polymer.

The flex durability of plasticized synthetic linear polyamides is greatly influenced by the viscosity of the polyamide in the fabricated article. For many uses, for example, fibers, an intrinsic viscosity above 0.4 is sufficient, although a viscosity of at least 0.8 is sometimes desirable. Still higher viscosities are advantageous for high flex durability in films and coated fabrics which are to be put to leather-like usage, and an intrinsic viscosity of at least 0.95 is usually desirable in this case. One method of compensating to some extent for the reduction in intrinsic viscosity likely to occur during melt blending is to use polymer of still higher viscosity, but polymer of very high viscosity is difficult to prepare and handle, and although polymers with an intrinsic viscosity of 2.0 or more may be used it is undesirable from a practical standpoint to use polymers having an intrinsic viscosity greater than about 1.6.

It is desirable to melt blend the plasticizer and the polymer at substantially the melting point of the polyamide, but this procedure is subject to certain limitations. Higher temperatures are sometimes required for special purposes, as for instance to increase anchorage when the plasticized composition is extruded as a coating upon fabric. Furthermore, the most desirable polymers are usually very viscous near their melting point, and mixing may be impractical unless the viscosity is lowered by raising the temperature. The difficulty in avoiding the detrimental effect of the plasticizer upon the polymer increases markedly, however, as the mixing temperature is raised, and temperatures as close to the melting point as practical are preferred. This will generally be lower than 300° C.

The synthetic linear polyamides used in the present process may be modified with other substances, for example, dyes, pigments, antioxidants; with viscosity stabilizers, for example, monofunctional acids; and with resins, for example, phenol-formaldehyde type resins, prior to, during or after plasticization. The invention is useful with mixtures of preformed polyamides as well as interpolyamides.

The superior physical properties of the plasticized compositions described herein add to their utility for many purposes. Typical applications are in yarns, fabrics, bristles, rods, tubes, films, safety glass interlayers, coatings for fabric, and insulation for electrical conductors. The superior flex durability is particularly advantageous when polyamide coated fabric is used as a substitute for leather. Shoes and upholstery are flexed repeatedly upon use, yet leather-like material made from polyamides plasticized according to this invention wears remarkably well and seldom fails as a result of cracking.

As many apparently widely different embodiments of this invention may be made without departing from the spirit and scope thereof, it is to be understood that I do not limit myself to the specific embodiments thereof except as defined in the appended claims.

I claim:

1. A process for preparing plasticized linear polyamides which comprises delivering to a mixing chamber a stream of molten polyamide having an intrinsic viscosity of at least 1.0 and a stream of plasticizing agent, rapidly forming a homogeneous mixture of the polyamide and plasticizing agent in said mixing chamber and continuously extruding, shaping, and cooling the resulting composition before the intrinsic viscosity of the polymer has been reduced below 0.95.

2. In a process for preparing plasticized linear polyamides of high flex durability by melt blending the polyamide and plasticizing agent, the steps comprising bringing a molten polyamide having an intrinsic viscosity of at least 1.0 into contact with a plasticizing agent, admixing said polyamide and plasticizing agent, and extruding, shaping, and cooling the resulting composition before the intrinsic viscosity of the polymer has been reduced below 0.95, said steps of admixing, extruding, shaping and cooling being carried out within 10 minutes of the initial contact between the plasticizing agent and polyamide.

3. A process for preparing plasticized linear polyamides which comprises continuously delivering to a heated mixing chamber a stream of molten polyamide and a stream of plasticizing agent which has been preheated to approximately the temperature of the molten polyamide, rapidly forming a homogeneous mixture of the polyamide and plasticizing agent in said mixing chamber at a temperature not substantially less than that of the melting point of the polyamide, and continuously cooling the homogeneous mixture as rapidly as it is formed by continuously extruding it in shaped form and promptly chilling the extruded product.

4. The process set forth in claim 1 in which said polyamide comprises the reaction product of a diamine and a dibasic carboxylic acid.

5. The process set forth in claim 1 in which said polyamide comprises a polymerized monoaminomonocarboxylic acid.

6. The process set forth in claim 1 in which said polyamide comprises the interpolymerization product of two different polyamide-forming compositions.

JOSEPH H. BALTHIS.